United States Patent
Ikeda et al.

(10) Patent No.: US 10,625,787 B2
(45) Date of Patent: Apr. 21, 2020

(54) FRONT PILLAR STRUCTURE

(71) Applicant: TOYOTA JIDOSHA KABUSHIKI KAISHA, Toyota-shi, Aichi-ken (JP)

(72) Inventors: Koki Ikeda, Toyota (JP); Motoya Sakabe, Nissin (JP); Kazuki Komoriya, Toyota (JP); Kazuyoshi Ogata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 130 days.

(21) Appl. No.: 15/933,761

(22) Filed: Mar. 23, 2018

(65) Prior Publication Data
US 2018/0273106 A1 Sep. 27, 2018

(30) Foreign Application Priority Data
Mar. 27, 2017 (JP) .................................. 2017-061557

(51) Int. Cl.
*B62D 25/04* (2006.01)
*B62D 29/04* (2006.01)
(Continued)

(52) U.S. Cl.
CPC .............. *B62D 25/04* (2013.01); *B60J 1/02* (2013.01); *B60J 1/06* (2013.01); *B62D 29/04* (2013.01); *B62D 29/043* (2013.01); *B60J 1/004* (2013.01)

(58) Field of Classification Search
CPC ............................. B62D 25/04; B62D 29/043
(Continued)

(56) References Cited

U.S. PATENT DOCUMENTS 1,470,308 A * 10/1923 Wilms ...................... B60J 1/12
49/204
1,593,005 A * 7/1926 Bailey ...................... B60J 10/70
296/193.06

(Continued)

FOREIGN PATENT DOCUMENTS

EP 0 686 543 A1 12/1995
FR 774173 A 11/1934
(Continued)

OTHER PUBLICATIONS

Oct. 5, 2018 Extended Search Report issued in European Application No. 18163742.2.
(Continued)

*Primary Examiner* — Joseph D. Pape
(74) *Attorney, Agent, or Firm* — Oliff PLC

(57) ABSTRACT

A front pillar structure includes a first skeleton portion, a second skeleton portion extending along the first skeleton portion with a gap therebetween, and a connecting member. A cross-section of the first skeleton portion is a hollow closed cross-section and a width of the first skeleton portion in a horizontal direction orthogonal to a gaze direction of a driver seated in a driver's seat is equal to or less than a standard pupillary distance. A cross-section of the second skeleton portion is a hollow closed cross-section and a width of the second skeleton portion in the horizontal direction orthogonal to the gaze direction is equal to or less than the standard pupillary distance. The connecting member is transparent and is disposed between the first skeleton portion and the second skeleton portion.

4 Claims, 6 Drawing Sheets

(51) Int. Cl.
*B60J 1/02* (2006.01)
*B60J 1/06* (2006.01)
*B60J 1/00* (2006.01)

(58) Field of Classification Search
USPC .................................................. 296/193.06
See application file for complete search history.

(56) References Cited

U.S. PATENT DOCUMENTS

| | | | | |
|---|---|---|---|---|
| 4,807,925 | A * | 2/1989 | Sakamoto | B62D 23/005 296/193.06 |
| 6,669,275 | B2 * | 12/2003 | Frasher | B60R 21/04 296/146.1 |
| 2011/0248525 | A1 * | 10/2011 | Lundstroem | B62D 25/04 296/191 |
| 2016/0368537 | A1 | 12/2016 | Toyota | |

FOREIGN PATENT DOCUMENTS

| | | |
|---|---|---|
| GB | 2479363 A | 10/2011 |
| JP | 2003-276519 A | 10/2003 |
| JP | 2006-096270 A | 4/2006 |
| JP | 2006-273057 A | 10/2006 |
| JP | 2010-269654 A | 12/2010 |
| JP | 2013-075661 A | 4/2013 |
| JP | 2017-007509 A | 1/2017 |
| WO | 2009/001910 A1 | 12/2008 |

OTHER PUBLICATIONS

Erclassicsholland. "Panhard Dynamic X77 1937—Video—www.ERclassics.com." YouTube. Nov. 19, 2016. p. 1. XP054978650. Retrieved from the Internet: URL: https://www.youtube.com/watch?v=LRLHILh9Kck [retrieved on Aug. 31, 2018].

Erclassicsholland. "Panhard Dynamic X77 1937—Video—www.ERclassics.com." YouTube. Nov. 19, 2016. p. 1. XP054978651, Retrieved from the Internet: URL: https://www.youtube.com/watch?v=DBaPwvjt-rY [retrieved on Aug. 31, 2018].

* cited by examiner

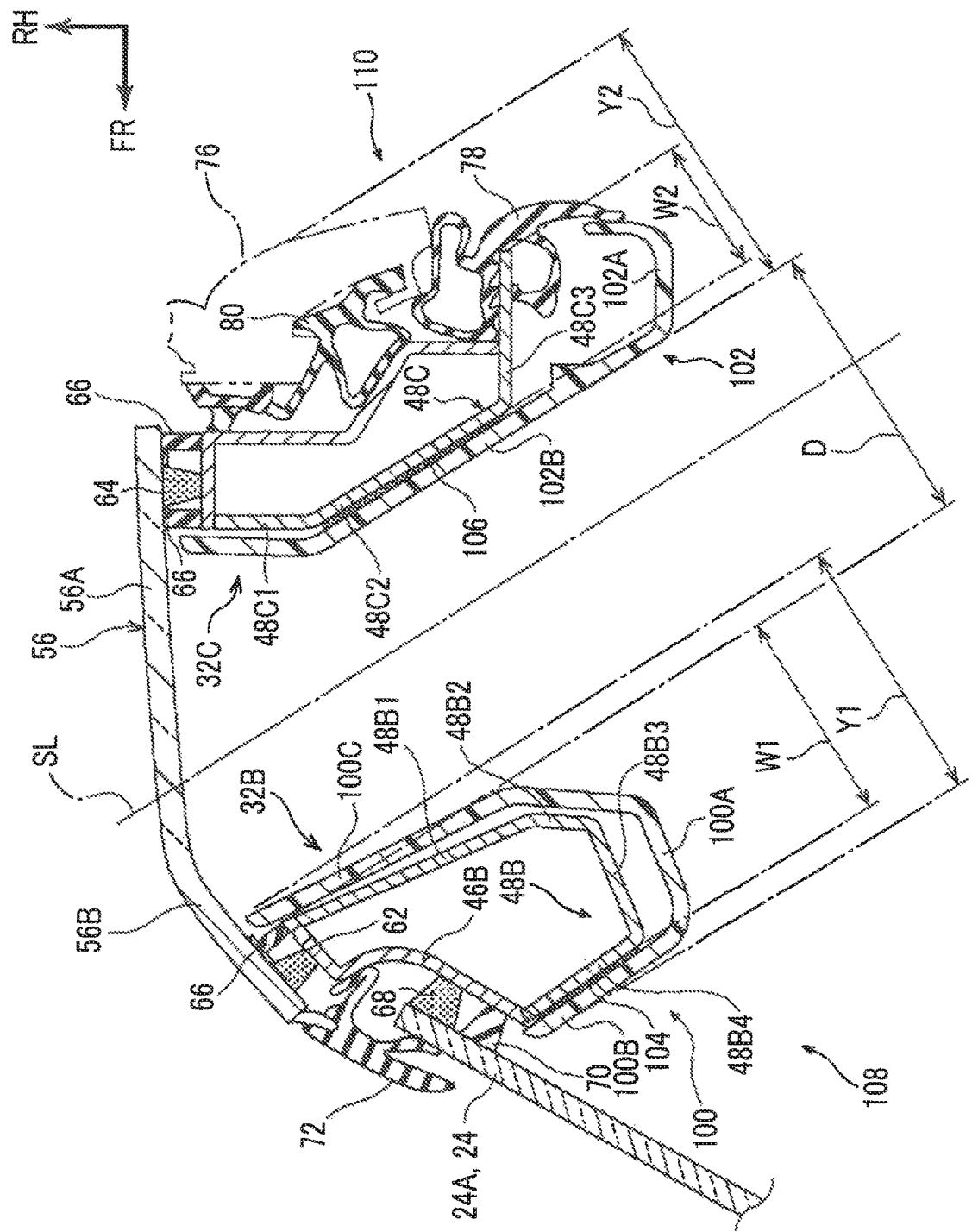

FRONT PILLAR STRUCTURE

INCORPORATION BY REFERENCE

The disclosure of Japanese Patent Application No. 2017-061557 filed on Mar. 27, 2017 including the specification, drawings and abstract is incorporated herein by reference in its entirety.

BACKGROUND

1. Technical Field

The disclosure relates to a front pillar structure.

2. Description of Related Art

Japanese Unexamined Patent Application Publication No. 2006-096270 (JP 2006-096270 A) discloses a vehicle body structure for the front portion of a vehicle. The vehicle body structure for the front portion of a vehicle is provided with a front corner member between a side edge portion of a windshield glass and a front edge portion of a side window and the front corner member extends along the side edge portion and the front edge portion. The front corner member is configured to include a front pillar and a door frame, and the width of the front corner member as seen by a driver seated in a driver's seat is set to 40 mm to 58 mm. Accordingly, with the related art disclosed in JP 2006-096270 A, the rigidity of the front corner member can be ensured and the visibility of the outside of the vehicle from the driver's seat can be improved at the same time.

SUMMARY

Although the rigidity of the front corner member is ensured with the related art, the rigidity of the front pillar as a single body is hardly ensured as the width of the front pillar constituting a part of the front corner member is smaller than the width of the front corner member described above. Although the rigidity of the front pillar can be improved by the front pillar being thickened, the visibility of the outside of the vehicle from the driver's seat is hardly ensured with such a configuration. In other words, the related art has room for improvement in that the rigidity of the front pillar and the visibility of the outside of the vehicle from the driver's seat have yet to be ensured at the same time.

The disclosure provides a front pillar structure that is capable of ensuring the rigidity of a front pillar and the visibility of the outside of a vehicle from a driver's seat at the same time.

A front pillar structure according to a first configuration includes a first skeleton portion extending along a peripheral edge portion of a windshield glass of a vehicle on an outer side in a vehicle width direction of the vehicle, a second skeleton portion extending along the first skeleton portion and separated by a gap from the first skeleton portion, and a connecting member. A cross-section of the first skeleton portion seen from a longitudinal direction of the first skeleton portion is a hollow closed cross-section and a width of the first skeleton portion in a horizontal direction orthogonal to a gaze direction of a driver seated in a driver's seat of the vehicle, located at a neutral position of the driver's seat, is equal to or less than a standard pupillary distance. A cross-section of the second skeleton portion seen from a longitudinal direction of the second skeleton portion is a hollow closed cross-section and a width of the second skeleton portion in the horizontal direction orthogonal to the gaze direction is equal to or less than the standard pupillary distance. The connecting member is transparent and is disposed between the first skeleton portion and the second skeleton portion.

According to the first configuration, the front pillar structure is configured to include the first skeleton portion and the second skeleton portion. The first skeleton portion extends along the peripheral edge portion of the windshield glass on the outer side in the vehicle width direction, and the cross-section of the first skeleton portion seen from the longitudinal direction is the hollow closed cross-section. The second skeleton portion extends along the first skeleton portion and is separated by the gap from the first skeleton portion, and the cross-section of the second skeleton portion seen from the longitudinal direction is the hollow closed cross-section.

Accordingly, in the first configuration, the second moment of area of the front pillar can be increased compared to a front pillar that has the same sectional area when seen from the longitudinal direction and is a closed sectional structure which has a single closed section as its section. As a result, the rigidity of the front pillar with respect to a load during rollover or the like can be increased.

In the first configuration, the transparent connecting member is disposed between the first skeleton portion and the second skeleton portion and the outside of the vehicle is visible to the driver through the gap between the first skeleton portion and the second skeleton portion. Accordingly, the visibility of the outside of the vehicle from the driver's seat can be increased compared to a front pillar that has the same sectional area when seen from the longitudinal direction and has a single closed section as its section.

Meanwhile, it is conceivable that the view of the driver is blocked by the first skeleton portion and the second skeleton portion when the front pillar on the driver's seat side is seen by the driver.

In this regard, in the first configuration, each of the widths of the first skeleton portion and the second skeleton portion in the horizontal direction orthogonal to the gaze direction of the driver is equal to or less than the standard pupillary distance. The "standard pupillary distance" means the average value of the pupillary distances (the distance between the centers of pupils) of a predetermined population (such as Japanese adult males). Accordingly, in the first configuration, expansion toward the outside of the vehicle of blind spots occurring in the first skeleton portion and the second skeleton portion when the front pillar on the driver's seat side is seen by the driver is further suppressed.

In the front pillar structure according to a second configuration, the gap between the first skeleton portion and the second skeleton portion in the horizontal direction orthogonal to the gaze direction may be equal to or greater than the standard pupillary distance.

According to the second configuration, the gap between the first skeleton portion and the second skeleton portion in the horizontal direction orthogonal to the gaze direction of the driver is equal to or greater than the standard pupillary distance. Accordingly, blind spot occurrence between the first skeleton portion and the second skeleton portion at a time when the front pillar on the driver's seat side is seen by the driver can be further suppressed.

The front pillar structure according to a third configuration may further include a frame of a side door extending along the second skeleton portion, and a rear side seal member interposed between the frame and the second skeleton portion. A width of a combination of the frame, the second skeleton portion, and the rear side seal member in the horizontal direction orthogonal to the gaze direction may be equal to or less than the standard pupillary distance.

According to the third configuration, expansion toward the outside of the vehicle of a blind spot occurring at the part made up of the frame, the second skeleton portion, and the rear side seal member when the front pillar side on the driver's seat side is seen by the driver is further suppressed.

The front pillar structure according to a fourth configuration may further include a front side seal member disposed on a boundary between the windshield glass and the first skeleton portion. A width of a combination of the first skeleton portion and the front side seal member in the horizontal direction orthogonal to the gaze direction may be equal to or less than the standard pupillary distance.

According to the fourth configuration, expansion toward the outside of the vehicle of a blind spot occurring at the part made up of the first skeleton portion and the front side seal member when the front pillar side on the driver's seat side is seen by the driver is further suppressed.

In the front pillar structure according to a fifth configuration, the connecting member includes a first transparent plate connected between a vehicle inner side part of the first skeleton portion and a vehicle inner side part of the second skeleton portion, and a second transparent plate connected between a vehicle outer side part of the first skeleton portion and a vehicle outer side part of the second skeleton portion, and an area bounded by the first skeleton portion, the second skeleton portion, the first transparent plate, and the second transparent plate may constitute a closed section.

According to the fifth configuration, the first plate is attached to the vehicle inner side of the front pillar on the driver's seat side and the vehicle inner side part of the first skeleton portion and the vehicle inner side part of the second skeleton portion are connected to each other by the first plate. The second plate is attached to the vehicle outer side of the front pillar and the vehicle outer side part of the first skeleton portion and the vehicle outer side part of the second skeleton portion are connected to each other by the second plate. The closed section is formed by the first skeleton portion, the second skeleton portion, the first plate, and the second plate.

Accordingly, in the fifth configuration, a load during rollover or the like can be supported with the closed section formed by the first skeleton portion, the second skeleton portion, the first plate, and the second plate and the view of the driver can be maintained between the first skeleton portion and the second skeleton portion.

A front pillar structure according to a sixth configuration is located on a driver's seat side of a vehicle and includes a first skeleton portion extending along a peripheral edge portion of a windshield glass of the vehicle on an outer side in a vehicle width direction of the vehicle, the first skeleton portion having a hollow closed cross-section seen from a longitudinal direction of the first skeleton portion, a second skeleton portion extending along the first skeleton portion and separated by a gap from the first skeleton portion, the second skeleton portion extending along a side door on the driver's seat side of the vehicle, the second skeleton portion having a hollow closed cross-section seen from a longitudinal direction of the second skeleton portion, and a transparent plate attached to a vehicle outer side of the front pillar structure, disposed between the first skeleton portion and the second skeleton portion, and connecting a vehicle outer side part of the first skeleton portion and a vehicle outer side part of the second skeleton portion to each other. The first skeleton portion includes a first attachment wall disposed at a position that is a blind spot of a driver seated in a driver's seat of the vehicle, located at a neutral position of the driver's seat, and a second attachment wall disposed at the position that is the blind spot and on a vehicle rear side of the first attachment wall and extending continuously to the first attachment wall, the peripheral edge portion of the windshield glass on the outer side in the vehicle width direction being attached to the first attachment wall and a vehicle-front-side peripheral edge portion of the transparent plate being attached to the second attachment wall.

According to the sixth configuration, the front pillar on the driver's seat side is configured to include the first skeleton portion and the second skeleton portion and the rigidity of the front pillar with respect to a load during rollover or the like can be increased.

In the sixth configuration, the transparent plate connecting the vehicle outer side part of the first skeleton portion and the vehicle outer side part of the second skeleton portion to each other is attached to the vehicle outer side of the front pillar and the transparent plate is disposed between the first skeleton portion and the second skeleton portion. Accordingly, the outside of the vehicle is visible to the driver through the gap between the first skeleton portion and the second skeleton portion.

Meanwhile, although the windshield glass and the transparent plate are attached to the first skeleton portion in the sixth configuration, it is conceivable that the view of the driver is blocked by the attachment places of the windshield glass and the transparent plate depending on how the attachment places of the windshield glass and the transparent plate are disposed.

In this regard, in the sixth configuration, the first skeleton portion is configured to include the first attachment wall and the second attachment wall and the first attachment wall is disposed at the position that is the blind spot of the driver. The second attachment wall is disposed at the position that is the blind spot and is on the vehicle rear side of the first attachment wall and extends continuously to the first attachment wall. The peripheral edge portion of the windshield glass on the outer side in the vehicle width direction is attached to the first attachment wall, and the vehicle-front-side peripheral edge portion of the transparent plate is attached to the second attachment wall.

Accordingly, in the sixth configuration, blocking of the view of the driver attributable to the attachment place of the windshield glass to the first attachment wall and the attachment place of the transparent plate to the second attachment wall can be further suppressed.

In the front pillar structure according to a seventh configuration, the vehicle-front-side peripheral edge portion of the transparent plate may be positioned on a rear outer side of the vehicle with respect to the peripheral edge portion of the windshield glass on the outer side in the vehicle width direction.

According to the seventh configuration, the vehicle-front-side peripheral edge portion of the transparent plate attached to the first skeleton portion is positioned on the rear outer side of the vehicle with respect to the peripheral edge portion of the windshield glass on the outer side in the vehicle width direction also attached to the first skeleton portion. Accordingly, in the seventh configuration, scattering toward the transparent plate of a liquid such as a washer fluid flowing along the windshield glass during traveling of the vehicle or the like can be further suppressed.

In the front pillar structure according to an eighth configuration, a front side seal member may be disposed in a boundary portion between the windshield glass and the transparent plate.

According to the eighth configuration, the front side seal member is disposed in the boundary portion between the windshield glass and the transparent plate, and thus the direction of the flow of the liquid such as the washer fluid flowing along the windshield glass can be changed with the front side seal member during traveling of the vehicle or the like.

A front pillar structure according to a ninth configuration is located on a driver's seat side of a vehicle and includes a first skeleton portion extending along a peripheral edge portion of a windshield glass of the vehicle on an outer side in a vehicle width direction of the vehicle, the first skeleton portion having a hollow closed cross-section seen from a longitudinal direction of the first skeleton portion, a second skeleton portion extending along the first skeleton portion and separated by a gap from the first skeleton portion, the second skeleton portion extending along a side door on the driver's seat side of the vehicle, the second skeleton portion having a hollow closed cross-section seen from a longitudinal direction of the second skeleton portion, and a transparent connecting portion disposed between the first skeleton portion and the second skeleton portion, the transparent connecting portion including a solid portion interposed between the first skeleton portion and the second skeleton portion, and connecting the first skeleton portion and the second skeleton portion to each other.

According to the ninth configuration, the front pillar on the driver's seat side is configured to include the first skeleton portion and the second skeleton portion, and the rigidity of the front pillar with respect to a load during rollover or the like can be increased. In the ninth configuration, the first skeleton portion and the second skeleton portion are connected to each other by the transparent connecting portion and the connecting portion is disposed between the first skeleton portion and the second skeleton portion. Accordingly, the view of the driver seated in the driver's seat can be ensured between the first skeleton portion and the second skeleton portion.

Meanwhile, it is preferable to further increase the rigidity of the part of the front pillar configured to include the first skeleton portion and the second skeleton portion when a load during rollover or the like is supported with the front pillar.

In this regard, in the ninth configuration, the connecting portion is provided with the solid portion interposed between the first skeleton portion and the second skeleton portion. Accordingly, the second moment of area of the section seen from the longitudinal direction of the front pillar can be further increased at the part of the front pillar configured to include the first skeleton portion and the second skeleton portion. As a result, the rigidity of the part with respect to a load during rollover or the like can be further improved.

In the front pillar structure according to a tenth configuration, the solid portion of the connecting portion includes (i) a first extending portion disposed on one of a vehicle outer side and a vehicle inner side of the first skeleton portion and extending from the solid portion toward the first skeleton portion side and (ii) a second extending portion disposed on one of a vehicle outer side and a vehicle inner side of the second skeleton portion and extending from the solid portion toward the second skeleton portion side. A front surface portion of the solid portion on the first skeleton portion side and a first side surface portion of the first extending portion on the first skeleton portion side may be joined to the first skeleton portion via a first joining portion that is elastically deformable. A rear surface portion of the solid portion on the second skeleton portion side and a second side surface portion of the second extending portion on the second skeleton portion side may be joined to the second skeleton portion via a second joining portion that is elastically deformable.

According to the tenth configuration, the connecting portion is provided with the first extending portion extending from the solid portion to the first skeleton portion side and the second extending portion extending from the solid portion to the second skeleton portion side. The first extending portion is disposed on one of the vehicle outer side and the vehicle inner side of the first skeleton portion, and the second extending portion is disposed on one of the vehicle outer side and the vehicle inner side of the second skeleton portion.

Meanwhile, it is conceivable that the first skeleton portion and the second skeleton portion are relatively displaced and the cross-sectional shape of the part of the front pillar configured to include the first skeleton portion and the second skeleton portion that is seen from the longitudinal direction cannot be maintained when the first skeleton portion and the second skeleton portion are deformed due to a load during rollover or the like.

In this regard, in the tenth configuration, the front surface portion of the solid portion on the first skeleton portion side and the first side surface portion of the first extending portion on the first skeleton portion side are joined to the first skeleton portion via the first joining portion that is elastically deformable. The rear surface portion of the solid portion on the second skeleton portion side and the second side surface portion of the second extending portion on the second skeleton portion side are joined to the second skeleton portion via the second joining portion that is elastically deformable.

Accordingly, in the tenth configuration, the relative displacement of the first skeleton portion and the second skeleton portion is supported with the solid portion, and the relative displacement is further suppressed when the first skeleton portion and the second skeleton portion are deformed in directions approaching each other. The relative displacement is further suppressed by restoring forces of the first joining portion and the second joining portion when the first skeleton portion and the second skeleton portion are deformed in directions away from each other.

In the front pillar structure according to an eleventh configuration, the solid portion is a first transparent plate and the connecting portion includes a second transparent plate. The first transparent plate connects a vehicle inner side part of the first skeleton portion and a vehicle inner side part of the second skeleton portion to each other. The second transparent plate connects a vehicle outer side part of the first skeleton portion and a vehicle outer side part of the second skeleton portion to each other.

According to the eleventh configuration, the vehicle inner side part of the first skeleton portion and the vehicle inner side part of the second skeleton portion are connected to each other by the first transparent plate provided with the solid portion, the first extending portion, and the second extending portion. Accordingly, the first joining portion and the second joining portion are disposed inside a vehicle cabin and the first joining portion and the second joining portion can be hidden by a pillar garnish or the like.

The vehicle outer side part of the first skeleton portion and the vehicle outer side part of the second skeleton portion are connected to each other by the second transparent plate. Accordingly, a closed section is formed by the first skeleton portion, the second skeleton portion, the first transparent plate, and the second transparent plate and a load during rollover or the like can be supported by the closed section.

In the front pillar structure according to a twelfth configuration, the connecting portion may is a transparent plate and connects a vehicle outer side part of the first skeleton portion and a vehicle outer side part of the second skeleton portion to each other.

According to the twelfth configuration, the connecting portion is disposed on the outer side of the vehicle and the parts of the first skeleton portion and the second skeleton portion that face the inside of the vehicle cabin can be hidden by a pillar garnish or the like.

In the front pillar structure according to a thirteenth configuration, the first skeleton portion and the second skeleton portion may be made of high-tensile steel.

According to the thirteenth configuration, the first skeleton portion and the second skeleton portion are made of high-tensile steel, and thus the strength of the front pillar with respect to a load during rollover or the like can be ensured and the front pillar can be reduced in thickness at the same time compared to a case where a general steel material constitutes the front pillar. The "high-tensile steel" means a steel material with a tensile strength of 490 [MPa] or more.

As described above, with the first configuration, an excellent effect can be achieved as the rigidity of the front pillar can be ensured and the visibility of the outside of the vehicle from the driver's seat can be ensured at the same time.

With the second configuration, an excellent effect can be achieved as the visibility of the outside of the vehicle from the driver's seat can be further improved in a case where the outside of the vehicle is seen by the driver through the gap between the first skeleton portion and the second skeleton portion.

With the third configuration, an excellent effect can be achieved as blocking of the view of the driver attributable to the frame and the rear side seal member can be further suppressed.

With the fourth configuration, an excellent effect can be achieved as blocking of the view of the driver attributable to the front side seal member can be further suppressed.

With the fifth configuration, an excellent effect can be achieved as the rigidity with respect to a load during rollover or the like of a vehicle body can be increased by the front pillar being reinforced, and the visibility of the outside of the vehicle from the driver's seat can be maintained at the same time.

With the sixth configuration, an excellent effect can be achieved as the rigidity of the front pillar can be ensured and the visibility of the outside of the vehicle from the driver's seat can be ensured at the same time.

With the seventh configuration, an excellent effect can be achieved as a decline in the visibility of the outside of the vehicle from the driver's seat attributable to liquid adhesion to the transparent plate can be further suppressed.

With the eighth configuration, an excellent effect can be achieved as a flow of the liquid flowing along the windshield glass toward the transparent plate can be further suppressed, and the accuracy of further suppressing liquid adhesion to the transparent plate can be improved.

With the ninth configuration, an excellent effect can be achieved as the rigidity of the front pillar can be ensured and the visibility of the outside of the vehicle from the driver's seat can be ensured at the same time.

With the tenth configuration, an excellent effect can be achieved as collapse of the cross-sectional shape of the section of the part configured to include the first skeleton portion and the second skeleton portion that is seen from the longitudinal direction can be further suppressed when the front pillar is deformed by a load during rollover or the like.

With the eleventh configuration, an excellent effect can be achieved as the design of the inside of the vehicle cabin can be ensured and the rigidity with respect to a load during rollover or the like of the vehicle body can be increased at the same time by the front pillar being reinforced.

With the twelfth configuration, an excellent effect can be achieved as the design of the front pillar seen from the inside of the vehicle cabin can be ensured.

With the thirteenth configuration, an excellent effect can be achieved as the strength of the front pillar can be ensured and the weight of the front pillar can be reduced at the same time.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 6 is an enlarged sectional view illustrating a configuration of a main part of a front pillar to which a front pillar structure according to a second embodiment is applied, in which the front pillar is seen from a longitudinal direction of the front pillar (cross-sectional view corresponding to FIG. 1).

DETAILED DESCRIPTION OF EMBODIMENTS

First Embodiment

Hereinafter, a first embodiment of a front pillar structure will be described with reference to FIGS. 1 to 5. The arrows FR, UP, and RH that are appropriately shown in each of the drawings represent the front side of a vehicle, the upper side of the vehicle, and the right side in the vehicle width direction, respectively.

Figure 2:
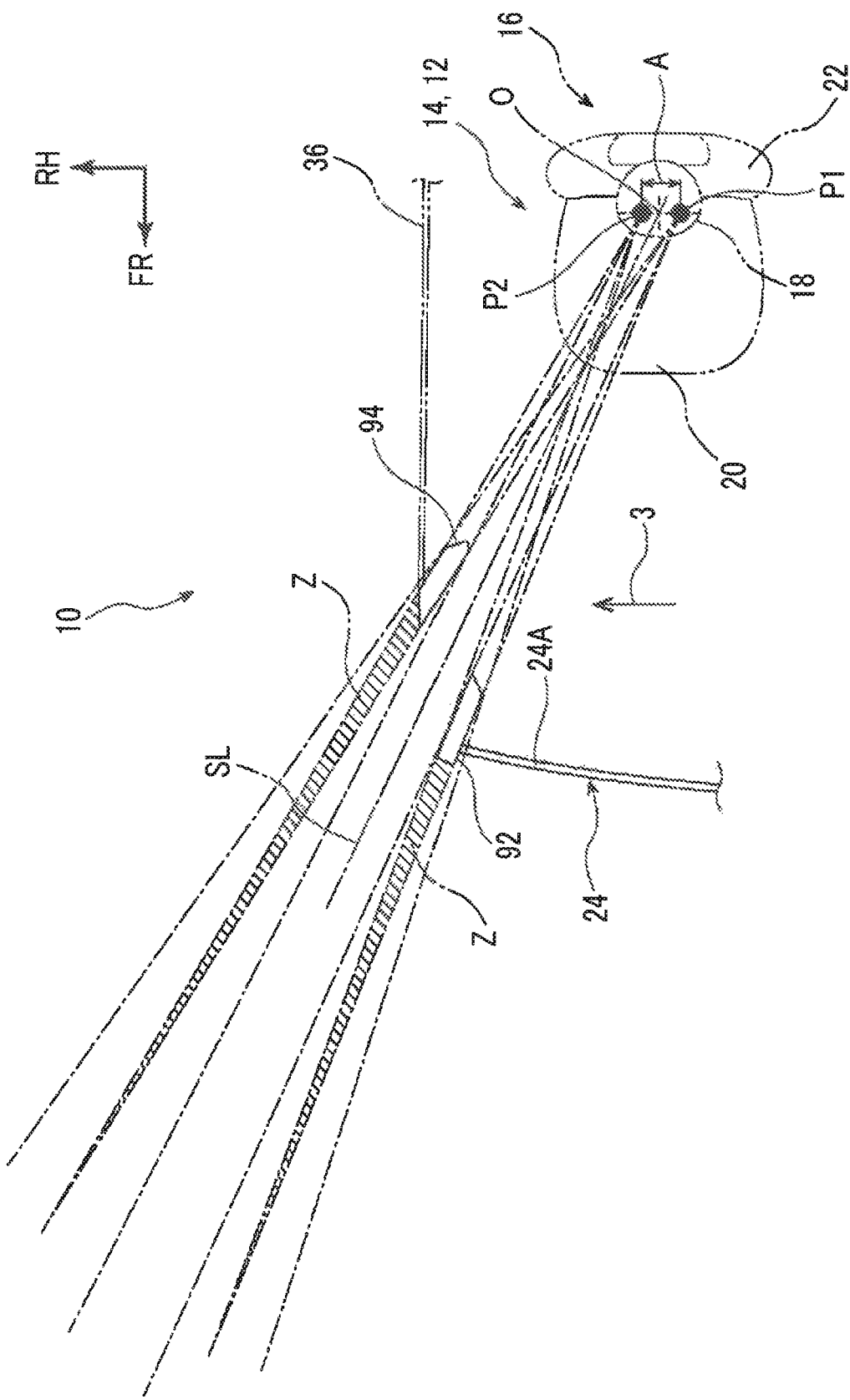
FIG. 2 is a plane sectional view schematically illustrating a configuration of a vehicle to which the front pillar structure according to the first embodiment is applied, which shows a state where the vehicle is cut at a reference eye point position (cross-sectional view illustrating a state of cutting along line II-II of FIG. 5)
Figure 5:
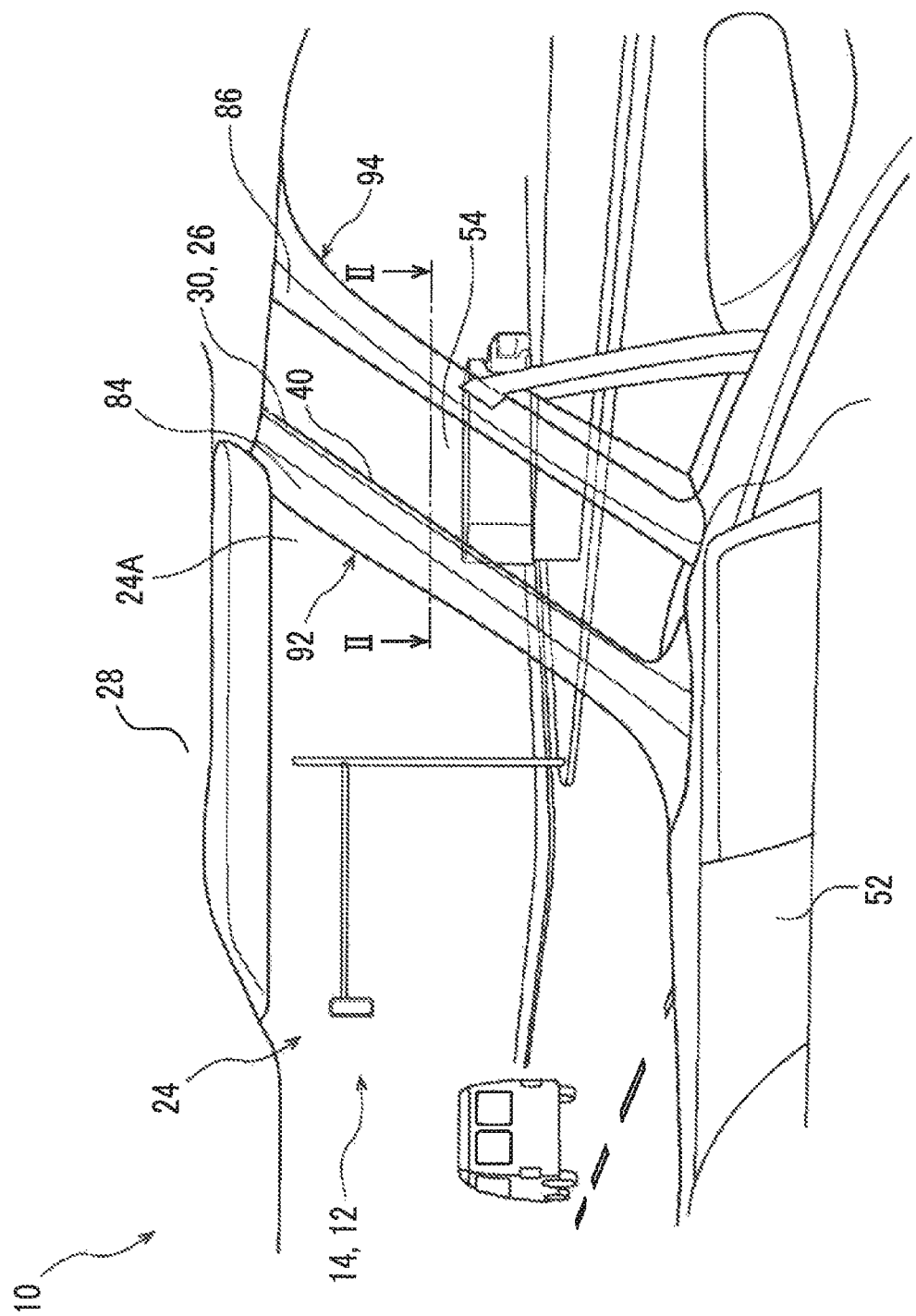
FIG. 5 is a perspective view seen from a driver seated in a driver's seat, which shows the front pillar to which the front pillar structure according to the first embodiment is applied and a peripheral portion of the front pillar.

A schematic configuration of a "vehicle 10" will be described first with reference to FIGS. 2 and 5. The front pillar structure according to the first embodiment is applied to the vehicle 10. As illustrated in FIGS. 2 and 5, a "vehicle seat 16" (hereinafter, referred to as a seat 16) as a driver's seat is disposed at a vehicle-width-direction right side part on the vehicle front side of a cabin 14 that constitutes a main part of a vehicle cabin 12 of the vehicle 10. In other words, in the first embodiment, the vehicle 10 is a right-hand drive vehicle.

The seat 16 is configured to include a seat cushion 20 and a seat back 22. A "driver 18" is seated on the seat cushion 20, and the seat back 22 supports the back of the driver 18. The lower end portion of the seat back 22 is rotatably connected to the rear end portion of the seat cushion 20. The seat 16 is supported by a slide rail (not illustrated) that is disposed on the lower side of the seat 16 and is capable of performing a sliding movement in the front-rear direction of the vehicle (front-rear direction of the seat).

"A windshield glass 24" is disposed on the vehicle front side of the cabin 14 (in front of the seat 16). A transparent glass plate constitutes the windshield glass 24. The windshield glass 24 extends from the front lower side of the vehicle toward the rear upper side of the vehicle when seen from the vehicle width direction. The windshield glass 24 is curved in a state where the middle portion of the windshield glass 24 bulges and is convex toward the front side of the vehicle.

A "peripheral edge portion 24A" on the vehicle-width-direction right side of the windshield glass 24 is supported by a "front pillar 30" disposed on the seat 16 side and constituting a part of a vehicle body 26 as described later. A peripheral edge portion (not illustrated) on the vehicle-width-direction left side of the windshield glass 24 is supported by a front pillar (not illustrated) on the vehicle-width-direction left side. The vehicle-lower-side peripheral edge portion (not illustrated) of the windshield glass 24 is fixed with an adhesive to a cowl (not illustrated) extending along the vehicle width direction. The vehicle-upper-side peripheral edge portion (not illustrated) of the windshield glass 24 is fixed with an adhesive to a front header (not illustrated) extending in the vehicle width direction in the front end portion of a roof 28 constituting the vehicle upper side part of the cabin 14.

The first embodiment is characterized by the configuration of the front pillar 30 and the peripheral portion of the front pillar 30. The configuration of the front pillar 30 and the peripheral portion of the front pillar 30 constituting a main part of the first embodiment will be described in detail below.

Figure 3:
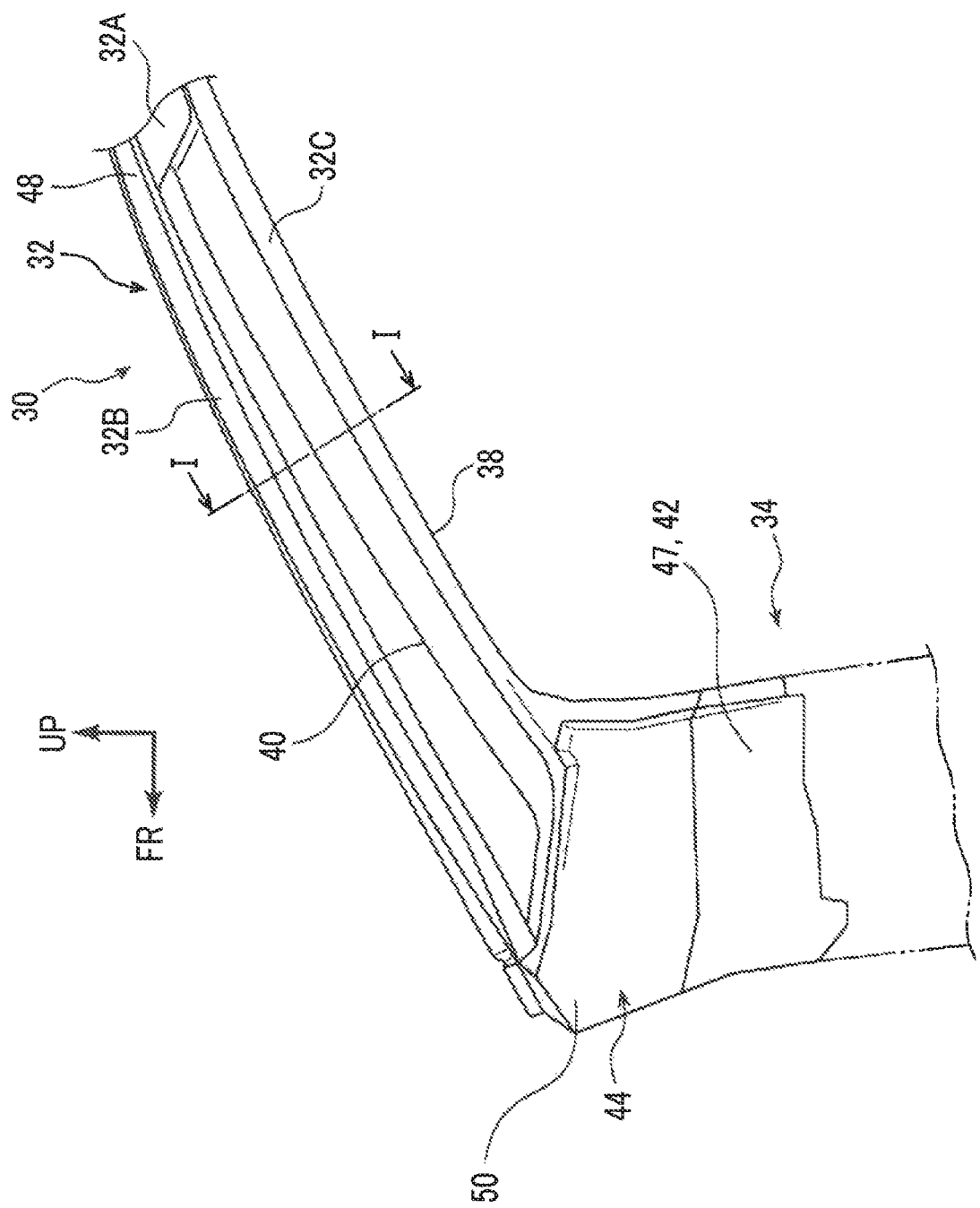
FIG. 3 is a side view seen from an inner side of the vehicle, which shows a configuration of the front pillar to which the front pillar structure according to the first embodiment is applied (three-directional arrow view of FIG. 2)

The configuration of the front pillar 30 will be described first with reference to FIGS. 1, 3, and 4. As illustrated in FIG. 3, the front pillar 30 is provided with a pillar upper 32 and a pillar lower 34. The pillar upper 32 constitutes the vehicle upper side part of the front pillar 30. The pillar upper 32 extends toward the rear upper side of the vehicle from the front lower side of the vehicle when seen from the vehicle width direction. The pillar lower 34 extends toward the lower side of the vehicle from the vehicle front side part of the pillar upper 32. Members disposed in the vicinity of the front pillar 30 are not illustrated in FIG. 3.

The pillar upper 32 is provided with a general portion 32A, a "first frame portion 32B" as a first skeleton portion, and a "second frame portion 32C" as a second skeleton portion. The general portion 32A constitutes the vehicle upper side part of the pillar upper 32. The general portion 32A bifurcates into two branches, one being the first frame portion 32B and the other being the second frame portion 32C. Each of the first frame portion 32B and the second frame portion 32C extends toward the front lower side of the vehicle. As also illustrated in FIG. 1, the pillar upper 32 constitutes a vehicle upper side part of an edge portion of a door opening portion 38 opened and closed with a "side door 36" disposed on the seat 16 side. The first frame portion 32B extends along the peripheral edge portion 24A of the windshield glass 24. The second frame portion 32C extends along the first frame portion 32B and is separated by a predetermined gap from respect to the first frame portion 32B as described later.

The pillar lower 34 constitutes a vehicle front side part of the edge portion of the door opening portion 38. The pillar lower 34 has a vehicle lower side part connected to a rocker (not illustrated) disposed along a vehicle-width-direction outer side peripheral edge portion of the floor portion (not illustrated) of the vehicle body 26. It can be seen that the pillar lower 34 connects the first frame portion 32B and the second frame portion 32C to each other on the vehicle lower sides of the first frame portion 32B and the second frame portion 32C and a penetration portion 40 extending in the longitudinal direction of the front pillar 30 is disposed in the front pillar 30.

Figure 4:
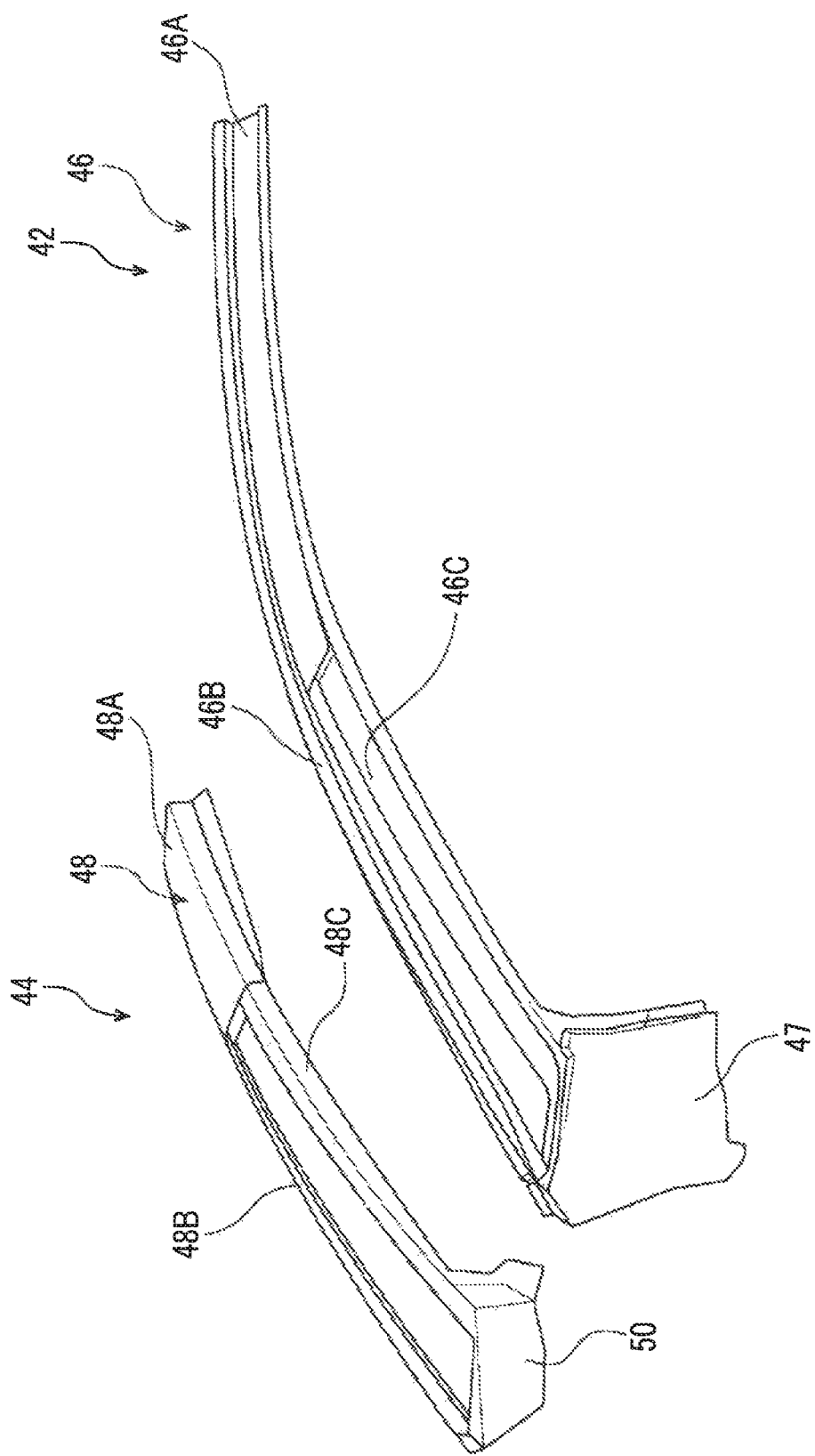
FIG. 4 is an exploded perspective view illustrating the configuration of the front pillar to which the front pillar structure according to the first embodiment is applied.

As illustrated in FIG. 4, the front pillar 30 is configured to include a pillar outer 42 and a pillar inner lower 44. Each of the pillar outer 42 and the pillar inner lower 44 is formed by press working being performed on a steel material, a high-tensile steel plate to be more specific. The high-tensile steel means a steel material with a tensile strength of 490 [MPa] or more. In the first embodiment, an ultra-high-tensile steel plate with a tensile strength of 1.5 [GPa] or more is used as an example of the material of the pillar outer 42 and the pillar inner lower 44.

The pillar outer 42 is configured to include an outer upper portion 46 and an outer lower portion 47. The outer upper portion 46 constitutes the vehicle-width-direction outer side part of the pillar upper 32. The outer lower portion 47 constitutes the vehicle-width-direction outer side part of the vehicle upper side part of the pillar lower 34. The outer upper portion 46 is provided with an outer side extending portion 46A constituting a part of the general portion 32A, a first frame outer portion 46B constituting a part of the first frame portion 32B, and a second frame outer portion 46C constituting a part of the second frame portion 32C. In the following description, the first frame outer portion 46B will be referred to as a first F outer portion 46B and the second frame outer portion 46C will be referred to as a second F outer portion 46C.

More specifically, the cross-sectional shape of the outer side extending portion 46A that is seen from the longitudinal direction of the front pillar 30 is a hat shape open on the vehicle-width-direction inner side and the vehicle upper side part of the outer side extending portion 46A constitutes a closed sectional structure along with a pillar inner upper (not illustrated). The outer side extending portion 46A has a vehicle lower side part joined to the pillar inner lower 44 as described later.

Figure 1:
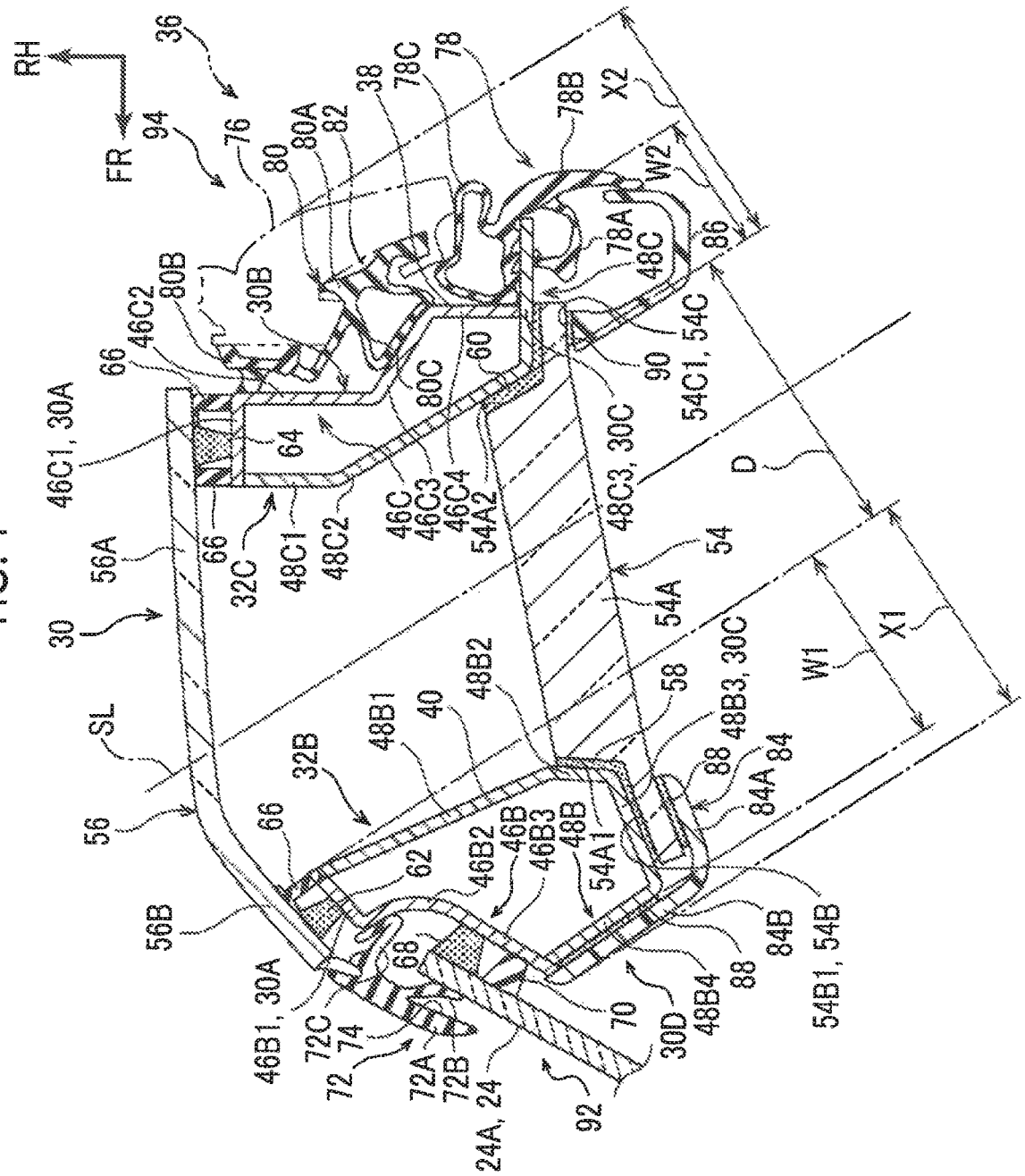
FIG. 1 is an enlarged sectional view illustrating a configuration of a main part of a front pillar to which a front pillar structure according to a first embodiment is applied, in which the front pillar is seen from a longitudinal direction of the front pillar (cross-sectional view illustrating a state of cutting along line I-I of FIG. 3)

As illustrated in FIG. 1, the first F outer portion 46B is configured to include a "first outer wall portion 46B1" as a second attachment wall portion, a curved wall portion 46B2, and a "second outer wall portion 46B3" as a first attachment wall portion that are disposed in this order from a vehicle-width-direction outer side. In sectional view seen from the longitudinal direction of the front pillar 30, the first outer wall portion 46B1 extends along an extension line extending toward a vehicle-width-direction outer side of the windshield glass 24 and constitutes a part of an outer side surface portion 30A facing the vehicle-width-direction outer side of the front pillar 30.

In sectional view seen from the longitudinal direction of the front pillar 30, the second outer wall portion 46B3 is disposed on the vehicle rear side of the windshield glass 24 and extends in parallel to the windshield glass 24. In sectional view seen from the longitudinal direction of the front pillar 30, the curved wall portion 46B2 is curved to be convex toward the rear side of the vehicle and connects the vehicle-front-side peripheral edge portion of the first outer wall portion 46B1 and the vehicle-rear-side peripheral edge portion of the second outer wall portion 46B3 to each other. In other words, the first outer wall portion 46B1 is disposed on the vehicle rear side of the second outer wall portion 46B3 and the first outer wall portion 46B1 extends continuously to the second outer wall portion 46B3 via the curved wall portion 46B2.

The second F outer portion 46C is configured to include an outer wall portion 46C1, a first rear wall portion 46C2, a second rear wall portion 46C3, and a third rear wall portion 46C4 that are disposed in this order from a vehicle-width-direction outer side. In sectional view seen from the longitudinal direction of the front pillar 30, the outer wall portion 46C1 extends in the front-rear direction of the vehicle and constitutes a part of the outer side surface portion 30A of the front pillar 30.

In sectional view seen from the longitudinal direction of the front pillar 30, the first rear wall portion 46C2 extends toward the vehicle-width-direction inner side from the vehicle-rear-side peripheral edge portion of the outer wall portion 46C 1. In sectional view seen from the longitudinal direction of the front pillar 30, the second rear wall portion 46C3 extends toward the rear inner side of the vehicle from the vehicle-width-direction inner side peripheral edge portion of the first rear wall portion 46C2 and the third rear wall portion 46C4 extends toward the vehicle-width-direction inner side from the vehicle-rear-side peripheral edge portion of the second rear wall portion 46C3. The first rear wall portion 46C2, the second rear wall portion 46C3, and the third rear wall portion 46C4 constitute a rear surface portion 30B facing the vehicle rear side of the front pillar 30.

Referring back to FIG. 4, the outer lower portion 47 has a plate shape bulging toward a vehicle-width-direction outer side and extending in the front-rear direction of the vehicle and the up-down direction of the vehicle when seen from the vehicle width direction and connects the first F outer portion 46B and the second F outer portion 46C to each other on the vehicle lower sides of the first F outer portion 46B and the second F outer portion 46C. The outer lower portion 47 is joined to the pillar inner lower 44 as described later.

The pillar inner lower 44 is configured to include an inner upper portion 48 and an inner lower portion 50. The inner upper portion 48 constitutes the vehicle-width-direction inner side part of the pillar upper 32. The inner lower portion 50 constitutes the vehicle-width-direction inner side part of the vehicle upper side part of the pillar lower 34. The inner upper portion 48 is provided with an inner side extending portion 48A constituting a part of the general portion 32A, a first frame inner portion 48B constituting a part of the first frame portion 32B, and a second frame inner portion 48C constituting a part of the second frame portion 32C. In the following description, the first frame inner portion 48B will be referred to as a first F inner portion 48B and the second frame inner portion 48C will be referred to as a second F inner portion 48C.

More specifically, the cross-sectional shape of the inner side extending portion 48A that is seen from the longitudinal direction of the front pillar 30 is a hat shape open on a vehicle-width-direction outer side. The inner side extending portion 48A constitutes a closed sectional structure with the outer side extending portion 46A by flange portions disposed on both sides of the inner side extending portion 48A in the front-rear direction of the vehicle being joined to flange portions of the outer side extending portion 46A respectively corresponding to the flange portions in joining portions (not illustrated) based on welding or the like.

As also illustrated in FIG. 1, the first F inner portion 48B includes a rear wall portion 48B1, an inclined wall portion 48B2, an inner wall portion 48B3, and a front wall portion 48B4 and the cross-sectional shape of the first F inner portion 48B that is seen from the longitudinal direction of the front pillar 30 is formed in a substantially J-shape. In sectional view seen from the longitudinal direction of the front pillar 30, the rear wall portion 48B1 is substantially orthogonal to the first outer wall portion 46B1 of the first F outer portion 46B and extends toward the vehicle-width-direction inner side from the vehicle-rear-side peripheral edge portion of the first outer wall portion 46B1.

The inclined wall portion 48B2 extends toward the vehicle-width-direction inner side from the vehicle-width-direction inner side peripheral edge portion of the rear wall portion 48B1 such that the extension direction of the inclined wall portion 48B2 corresponds to the vehicle width direction. In sectional view seen from the longitudinal direction of the front pillar 30, the inclined wall portion 48B2 is in a state of being inclined toward the front side of the vehicle with respect to the rear wall portion 48B1.

The inner wall portion 48B3 extends toward the front side of the vehicle from the vehicle-width-direction inner side peripheral edge portion of the inclined wall portion 48B2. In sectional view seen from the longitudinal direction of the front pillar 30, the inner wall portion 48B3 is in a state of being slightly inclined toward the vehicle-width-direction inner side with respect to the front-rear direction of the vehicle. The inner wall portion 48B3 constitutes a part of an inner side surface portion 30C facing the vehicle-width-direction inner side of the front pillar 30.

In sectional view seen from the longitudinal direction of the front pillar 30, the front wall portion 48B4 extends from the vehicle-front-side peripheral edge portion of the inner wall portion 48B3 toward a vehicle-width-direction outer side, toward the vehicle-front-side peripheral edge portion of the second outer wall portion 46B3 of the first F outer portion 46B to be more specific. The front wall portion 48B4 and the first F outer portion 46B constitute a front surface portion 30D facing the vehicle front side of the front pillar 30.

The second F inner portion 48C is configured to include a front wall portion 48C1, an inclined wall portion 48C2, and an inner wall portion 48C3 that are disposed in this order from a vehicle-width-direction outer side. In sectional view seen from the longitudinal direction of the front pillar 30, the front wall portion 48C1 is orthogonal to the outer wall portion 46C1 of the second F outer portion 46C and extends toward the vehicle-width-direction inner side from the vehicle-front-side peripheral edge portion of the outer wall portion 46C1.

In sectional view seen from the longitudinal direction of the front pillar 30, the inclined wall portion 48C2 extends toward the rear inner side of the vehicle from the vehicle-width-direction inner side peripheral edge portion of the front wall portion 48C1 and is in a state of being inclined toward the rear side of the vehicle with respect to the front wall portion 48C1.

In sectional view seen from the longitudinal direction of the front pillar 30, the inner wall portion 48C3 extends in the front-rear direction of the vehicle toward the rear side of the vehicle from the vehicle-width-direction inner side peripheral edge portion of the inclined wall portion 48C2 and extends toward the rear side of the vehicle beyond the third rear wall portion 46C4 of the second F outer portion 46C. The inner wall portion 48C3 constitutes a part of the inner side surface portion 30C facing the vehicle-width-direction inner side of the front pillar 30.

The vehicle-width-direction outer side end portion of the rear wall portion 48B1 of the first F inner portion 48B abuts against the vehicle-rear-side end portion of the first outer wall portion 46B1 of the first F outer portion 46B, and the vehicle-rear-side end portion and the vehicle-width-direction outer side end portion are joined to each other in a joining portion based on laser welding or the like. The vehicle-width-direction outer side end portion of the front wall portion 48B4 of the first F inner portion 48B abuts against the vehicle-front-side end portion of the second outer wall portion 46B3 of the first F outer portion 46B, and the vehicle-front-side end portion and the vehicle-width-direction outer side end portion are joined to each other in a joining portion based on laser welding or the like. In other words, the first frame portion 32B configured as described above is a closed sectional structure and the section of the closed sectional structure that is seen from the longitudinal direction of the front pillar 30 is a closed section.

The vehicle-width-direction outer side end portion of the front wall portion 48C1 of the second F inner portion 48C abuts against the vehicle-front-side end portion of the outer wall portion 46C1 of the second F outer portion 46C, and the vehicle-front-side end portion and the vehicle-width-direction outer side end portion are joined to each other in a joining portion based on laser welding or the like. The vehicle-width-direction inner side end portion of the third rear wall portion 46C4 of the second F outer portion 46C abuts against the inner wall portion 48C3 of the second F inner portion 48C, and the inner wall portion 48C3 and the vehicle-width-direction inner side end portion are joined to each other in a joining portion based on laser welding or the like. In other words, the second frame portion 32C configured as described above is a closed sectional structure and the section of the closed sectional structure that is seen from the longitudinal direction of the front pillar 30 is a closed section.

As illustrated in FIG. 4, the inner lower portion 50 has a plate shape extending in the front-rear direction of the vehicle and the up-down direction of the vehicle when seen from the vehicle width direction and connects the first F inner portion 48B and the second F inner portion 48C to each other on the vehicle lower sides of the first F inner portion 48B and the second F inner portion 48C. The inner lower portion 50 constitutes a closed sectional structure with the outer lower portion 47 by being joined to the outer lower portion 47 in a joining portion (not illustrated) based on welding or the like.

In the first embodiment, a width W1 of the first frame portion 32B in the direction that is orthogonal to the gaze direction of the driver 18 is equal to or less than a standard pupillary distance A in sectional view seen from the longitudinal direction of the front pillar 30 as illustrated in FIG. 1. Likewise, a width W2 of the second frame portion 32C in the direction that is orthogonal to the gaze direction of the driver 18 is equal to or less than the standard pupillary distance A in sectional view seen from the longitudinal direction of the front pillar 30. The lower limit values of the width W1 of the first frame portion 32B and the width W2 of the second frame portion 32C are set to minimum dimensions at which the rigidity of the front pillar 30 with respect to a load during rollover or the like can be ensured.

A gap D equal to or greater than the standard pupillary distance A is present between the first frame portion 32B and the second frame portion 32C in the direction orthogonal to the gaze direction of the driver 18 in sectional view seen from the longitudinal direction of the front pillar 30. As a result, the outside of the vehicle is visible to the driver 18 through the gap between the first frame portion 32B and the second frame portion 32C.

To be more specific with reference to the drawings including FIG. 2, the standard pupillary distance A means the average value of the distances between predetermined population's right and left eye pupil centers, that is, pupillary distances. Japanese adults have a standard pupillary distance of 60 [mm] to 65 [mm]. Accordingly, in the first embodiment, the width W1 of the first frame portion 32B, the width W2 of the second frame portion 32C, and the width of the gap D between the first frame portion 32B and the second frame portion 32C are set after, for example, the standard pupillary distance A is set to 65 [mm]. The standard pupillary distance A may also be set after an appropriate change in population depending on target countries, regions, and so on. For example, the standard pupillary distance A can be appropriately set within a range of 50 [mm] to 80 [mm] depending on target countries, regions, and so on.

In the first embodiment, the "gaze direction of the driver 18" means the direction of the gaze of the driver 18 seated in the seat 16 and seeing the front pillar 30. In each of the drawings, the gaze direction of the driver 18 is indicated by a straight line SL extending toward the front pillar 30 from a center O of a reference eye point.

In the first embodiment, a point at a height of, for example, 635 [mm] from a seating reference point toward the upper side (vertical upper side) of the vehicle is set as the center O in a state where the seat position of the seat 16 is neutral (neutral position), that is, in the middle between frontmost (foremost position) and rearmost (rearmost position). The seating reference point means the position of the hip joint of a mannequin seated in the seat based on ISO 6549-1980 or a design reference position set on the seat and corresponding to the position.

In the first embodiment, the points that represent the positions of the eyes of the driver 18 in a normal operation state, that is, reference eye points P1, P2 are two points that have a vehicle-width-direction gap set to 65 [mm] based on the center O. In the first embodiment, a flat section means a flat section in a state where the vehicle 10 is cut at the height of the center O (reference eye points P1, P2) unless otherwise noted.

As also illustrated in FIG. 5, in the first embodiment, the shape of the penetration portion 40 disposed in the front pillar 30 is a rectangular shape when seen from the gaze direction of the driver 18 and the gap D between the first frame portion 32B and the second frame portion 32C is set to, for example, 65 [mm]. The gap D is maintained up to the vehicle-upper-side 200 [mm] position above the center O from the boundary portion between the front pillar 30 and an instrument panel 52 at a time when the front pillar 30 side is seen by the driver 18. The front pillar 30 is configured such that none of the width W1 of the first frame portion 32B, the width W2 of the second frame portion 32C, and the gap D between the first frame portion 32B and the second frame portion 32C changes in sectional view and cross-sectional view seen from the longitudinal direction of the front pillar 30.

A "first plate material 54" as a transparent member and a connecting portion is disposed on the vehicle inner side of the front pillar 30, and the vehicle inner side part of the first frame portion 32B and the vehicle inner side part of the second frame portion 32C are connected to each other by the first plate material 54. A "second plate material 56" as a transparent member and a connecting portion is disposed on the vehicle outer side of the front pillar 30, and the vehicle outer side part of the first frame portion 32B and the vehicle outer side part of the second frame portion 32C are connected to each other by the second plate material 56. In other words, the first plate material 54 and the second plate material 56 are disposed between the first frame portion 32B and the second frame portion 32C when seen from the gaze direction of the driver 18. Each of the first plate material 54 and the second plate material 56 is formed of a transparent material such as inorganic glass and a high-strength transparent resin. Examples of the high-strength transparent resin include glass fiber reinforced polycarbonate (PC-GF) and cellulose nanofibers (CNF).

More specifically, the first plate material 54 as a whole has a plate shape extending along the front pillar 30 and is configured to include a "solid portion 54A", a "first extending portion 54B", and a "second extending portion 54C".

In sectional view seen from the longitudinal direction of the front pillar 30, the solid portion 54A has a trapezoidal cross-sectional shape that is widened toward the inner side of the vehicle from an outer side of the vehicle. The solid portion 54A is interposed between the first frame portion 32B and the second frame portion 32C, between the inclined wall portion 48B2 of the first frame portion 32B and the inclined wall portion 48C2 of the second frame portion 32C to be more specific.

In sectional view seen from the longitudinal direction of the front pillar 30, the first extending portion 54B extends toward the front side of the vehicle (first frame portion 32B side) from the peripheral edge portion of the solid portion 54A that is on the front inner side of the vehicle. When seen from the inner side of the vehicle, the first extending portion 54B has a substantially rectangular plate shape extending along the solid portion 54A. In sectional view seen from the longitudinal direction of the front pillar 30, the second extending portion 54C extends toward the rear side of the vehicle (second frame portion 32C side) from the peripheral edge portion of the solid portion 54A that is on the rear inner side of the vehicle. When seen from the inner side of the vehicle, the second extending portion 54C has a substantially rectangular plate shape extending along the solid portion 54A.

The first plate material 54 is joined to the first frame portion 32B in a "joining portion 58" as a first joining portion that can be elastically deformed and is joined to the second frame portion 32C in a "joining portion 60" as a second joining portion that can be elastically deformed. An adhesive and an adhesive body that have elasticity and flexibility constitute the joining portions 58, 60, examples of which include a urethane adhesive.

More specifically, the inner wall portion 48B3 of the first frame portion 32B and a "side surface portion 54B1" as a first side surface portion of the first extending portion 54B on the first frame portion 32B side are joined to each other by the vehicle front side part of the joining portion 58. The inclined wall portion 48B2 of the first frame portion 32B and a "front surface portion 54A1" of the solid portion 54A on the first frame portion 32B side are joined to each other by the vehicle rear side part of the joining portion 58.

The inclined wall portion 48C2 of the second frame portion 32C and a "rear surface portion 54A2" of the solid portion 54A on the second frame portion 32C side are joined to each other by the vehicle front side part of the joining portion 60. The inner wall portion 48C3 of the second frame portion 32C and a "side surface portion 54C1" as a second side surface portion of the second extending portion 54C on the second frame portion 32C side are joined to each other by the vehicle rear side part of the joining portion 60.

The second plate material 56 has a plate shape extending along the front pillar 30 and is configured to include a side wall portion 56A constituting a main part of the second plate material 56 and a front wall portion 56B constituting the vehicle front side part of the second plate material 56. In sectional view seen from the longitudinal direction of the front pillar 30, the side wall portion 56A is disposed such that its plate thickness direction corresponds to the vehicle width direction and the front wall portion 56B extends toward the front inner side of the vehicle from the vehicle-front-side peripheral edge portion of the side wall portion 56A.

The vehicle-front-side peripheral edge portion of the second plate material 56 is attached to the first outer wall portion 46B1 of the first frame portion 32B via a joining portion 62 based on a urethane adhesive or the like. The vehicle-rear-side peripheral edge portion of the second plate material 56 is joined to the outer wall portion 46C1 of the second frame portion 32C in a joining portion 64 based on a urethane adhesive or the like. Cushion rubber 66 is attached to each of the vehicle rear side of the joining portion 62 and both sides of the joining portion 64 in the front-rear direction of the vehicle.

In the first embodiment, a closed sectional structure that has a flat closed section formed by the first frame portion 32B, the second frame portion 32C, the first plate material 54, and the second plate material 56 is realized by the first plate material 54 and the second plate material 56 being attached to the front pillar 30 as described above.

The peripheral edge portion 24A of the windshield glass 24 is attached, via a joining portion 68 based on a urethane adhesive or the like, to the vehicle outer side surface of the second outer wall portion 46B3 of the first frame portion 32B. Cushion rubber 70 is provided in front of the vehicle front side of the joining portion 68.

The first outer wall portion 46B1 and the second outer wall portion 46B3 of the first frame portion 32B are disposed at positions that are blind spots when seen by the driver 18. In other words, the joining portion 62 between the first outer wall portion 46B1 and the second plate material 56 and the joining portion 68 between the second outer wall portion 46B3 and the windshield glass 24 are hidden from the view of the driver 18.

The vehicle-front-side peripheral edge portion of the second plate material 56 is positioned on the rear outer side of the vehicle with respect to the peripheral edge portion 24A of the windshield glass 24. A "windshield molding 72" as a front side seal member is disposed in the boundary portion between the second plate material 56 and the windshield glass 24.

The windshield molding 72 is disposed along the peripheral edge portion 24A of the windshield glass 24 and is configured to include a molding body portion 72A, a front side lip portion 72B, and a rear side lip portion 72C. Specifically, in sectional view seen from the longitudinal direction of the front pillar 30, the molding body portion 72A is disposed on the vehicle front side of the windshield glass 24 and has a plate shape extending along the windshield glass 24 at a predetermined gap in the thickness direction of the windshield glass 24.

The front side lip portion 72B extends toward the vehicle-width-direction inner side from the middle portion of the molding body portion 72A and is in contact with the peripheral edge portion 24A of the windshield glass 24. The front side lip portion 72B constitutes a flow path portion 74 with the molding body portion 72A. During traveling of the vehicle 10 or the like, a liquid such as a washer fluid flowing along the surface of the windshield glass 24 flows through the flow path portion 74. The rear side lip portion 72C extends toward the rear side of the vehicle from the middle portion of the molding body portion 72A and is in contact with the curved wall portion 46B2 of the first frame portion 32B.

In a state where the side door 36 is closed, a "frame 76" of the side door 36 is in a state where the frame 76 extends along the second frame portion 32C. "Weather strips 78, 80" as rear side seal members are interposed between the frame 76 and the second frame portion 32C.

The weather strip 78 is disposed along an end portion of the inner wall portion 48C3 of the second frame portion 32C and is configured to include a locking portion 78A, an extending portion 78B, and a hollow seal portion 78C. Specifically, the locking portion 78A has a U-shaped cross section and is locked to the end portion of the inner wall portion 48C3. The extending portion 78B has a plate shape extending toward the inner side of the vehicle from the locking portion 78A. The hollow seal portion 78C has a circular cross-sectional shape when seen from the longitudinal direction of the hollow seal portion 78C and bulges toward the outer side of the vehicle from the locking portion 78A. In a state where the side door 36 is closed, the hollow seal portion 78C is crushed by the frame 76 and is in close contact with the frame 76.

The weather strip 80 is disposed along the frame 76 and is configured to include a locking portion 80A, an extending portion 80B, and a hollow seal portion 80C. Specifically, the locking portion 80A has a plate shape extending substantially in the vehicle width direction in sectional view seen from the longitudinal direction of the front pillar 30 and is locked to a locked portion 82 disposed in the frame 76. The extending portion 80B extends toward the outer side of the vehicle from the locking portion 80A, is disposed along the vehicle front side surface of the frame 76, and is provided with a projection portion protruding toward the front side of the vehicle in a tip portion of the extending portion 80B. The hollow seal portion 80C bulges toward the front side of the vehicle from the locking portion 80A so as to have a circular cross-sectional shape when seen from the longitudinal direction of the hollow seal portion 80C. In a state where the side door 36 is closed, the hollow seal portion 80C and the projection portion of the extending portion 80B are crushed and are in close contact with the rear surface portion 30B of the front pillar 30.

In a state where the first plate material 54 is attached to the front pillar 30, the vehicle inner side of the first frame portion 32B is covered by a first pillar garnish 84 and the vehicle inner side of the second frame portion 32C is covered by a second pillar garnish 86.

Specifically, the first pillar garnish 84 has an L-shaped cross section when seen from the longitudinal direction of the front pillar 30 and has a plate shape extending along the first frame portion 32B. The first pillar garnish 84 is configured to include an inner side wall portion 84A and a front side wall portion 84B. The inner wall portion 48B3 of the first frame portion 32B and the first extending portion 54B of the first plate material 54 are covered from the inner side of the vehicle by the inner side wall portion 84A, and the front wall portion 48B4 of the first frame portion 32B is covered from the front side of the vehicle by the front side wall portion 84B. The first pillar garnish 84 is attached to the front wall portion 48B4 and the first extending portion 54B via a joining portion 88 based on a urethane adhesive or the like.

The cross-sectional shape of the second pillar garnish 86 that is seen from the longitudinal direction of the front pillar 30 is a U-shape open toward a vehicle-width-direction outer side, and the second pillar garnish 86 has a plate shape extending along the second frame portion 32C. The second pillar garnish 86 covers the inner wall portion 48C3 of the second frame portion 32C and the second extending portion 54C of the first plate material 54 from the inner side of the vehicle. The second pillar garnish 86 is attached to the second extending portion 54C via a joining portion 90 based on a urethane adhesive or the like.

In cross-sectional view, a width X1 of the part (hereinafter, referred to as a first component portion 92) made up of the first frame portion 32B, the windshield molding 72, and the first pillar garnish 84 in the direction orthogonal to the gaze direction of the driver 18 is equal to or less than the standard pupillary distance A. In the first embodiment, the width X1 of the first component portion 92 is set to, for example, 44 [mm].

In cross-sectional view, a width X2 of the part (hereinafter, referred to as a second component portion 94) made up of the second frame portion 32C, the frame 76, the weather strips 78, 80, and the second pillar garnish 86 in the direction orthogonal to the gaze direction of the driver 18 is equal to or less than the standard pupillary distance A as well. In the first embodiment, the width X2 of the second component portion 94 is set to, for example, 53 [mm]. In FIG. 2, merely outlines in cross-sectional view are illustrated when it comes to the first component portion 92 and the second component portion 94.

Action and Effect of First Embodiment

The action and effect of the first embodiment will be described below.

In the first embodiment, the front pillar 30 on the seat 16 side is configured to include the first frame portion 32B and the second frame portion 32C as illustrated in FIG. 1. The first frame portion 32B constitutes a part of the front pillar 30 on the windshield glass 24 side and extends along the peripheral edge portion 24A of the windshield glass 24. The first frame portion 32B is a closed sectional structure and the section of the closed sectional structure that is seen from the longitudinal direction of the windshield glass 24 is a closed section. The second frame portion 32C constitutes a part of the front pillar 30 on the side door 36 side that is disposed on the seat 16 side and extends along the first frame portion 32B with a gap separating the second frame portion 32C from the first frame portion 32B. The second frame portion 32C is a closed sectional structure and the section of the closed sectional structure that is seen from the longitudinal direction of the first frame portion 32B is a closed section.

Accordingly, in the first embodiment, the second moment of area of the section that is seen from the longitudinal direction of the front pillar 30 can be increased compared to a front pillar that has the same sectional area when seen from the longitudinal direction and is a closed sectional structure which has a single closed section as its section. As a result, the rigidity of the front pillar 30 with respect to a load during rollover or the like can be increased.

In the first embodiment, the first plate material 54 and the second plate material 56 are disposed between the first frame portion 32B and the second frame portion 32C when seen from the gaze direction of the driver 18 seated in the seat 16. As a result, the outside of the vehicle is visible to the driver 18 through the gap between the first frame portion 32B and the second frame portion 32C. Accordingly, in the first embodiment, the visibility of the outside of the vehicle from the seat 16 can be increased compared to a front pillar that has the same sectional area when seen from the longitudinal direction and is a closed sectional structure which has a single closed section as its section.

It is conceivable that the view of the driver 18 is blocked by the first frame portion 32B and the second frame portion 32C when the front pillar 30 on the seat 16 side is seen by the driver 18.

In this regard, in the first embodiment, each of the widths W1, W2 of the first frame portion 32B and the second frame portion 32C in the direction orthogonal to the gaze direction of the driver 18 in cross-sectional view is equal to or less than the standard pupillary distance A. Accordingly, in the first embodiment, expansion toward the outside of the vehicle of blind spots Z caused by the first frame portion 32B and the second frame portion 32C when the front pillar 30 on the seat 16 side is seen by the driver 18 as also illustrated in FIG. 2 is further suppressed. Therefore, in the first embodiment, the rigidity of the front pillar 30 can be ensured and the visibility of the outside of the vehicle from the seat 16 can be ensured at the same time.

In the first embodiment, the gap D in cross-sectional view between the first frame portion 32B and the second frame portion 32C in the direction orthogonal to the gaze direction of the driver 18 is equal to or greater than the standard pupillary distance A. Accordingly, blind spot occurrence between the first frame portion 32B and the second frame portion 32C at a time when the front pillar 30 on the seat 16 side is seen by the driver 18 can be further suppressed. Therefore, in the first embodiment, the visibility of the outside of the vehicle from the seat 16 can be further improved in a case where the outside of the vehicle is seen by the driver 18 through the gap between the first frame portion 32B and the second frame portion 32C.

More specifically, the regions of the first frame portion 32B and the second frame portion 32C that have the width of the standard pupillary distance A on the outside of the vehicle become the blind spots Z in a case where the width W1 of the first frame portion 32B and the width W2 of the second frame portion 32C are the standard pupillary distance A. In other words, when the front pillar 30 side is seen by the driver 18, the regions on the outside of the vehicle overlapping the first frame portion 32B and the second frame portion 32C are not visible to the driver 18. However, the standard pupillary distance A is set to 65 [mm] as described above, and thus the occurrence of the blind spots Z making the outside of the vehicle hardly visible can be further suppressed.

The blind spots Z converge toward the vicinity of the front pillar 30 and a finite range in a case where the width W1 of the first frame portion 32B and the width W2 of the second frame portion 32C are less than the standard pupillary distance A (refer to FIG. 2).

In other words, when the front pillar 30 side is seen by the driver 18, the driver 18 can see the outside of the vehicle with at least one eye with the exception of the regions in close proximity to the first frame portion 32B and the second frame portion 32C. Accordingly, in the first embodiment, the front pillar 30 becomes visually semi-transparent as illustrated in FIG. 5 when the front pillar 30 side is seen by the driver 18, and thus the outside of the vehicle can be seen with ease.

Referring back to FIG. 1, in the first embodiment, the frame 76 of the side door 36 extends along the second frame portion 32C and the weather strips 78, 80 are interposed between the frame 76 and the second frame portion 32C in a state where the side door 36 on the seat 16 side is closed. In cross-sectional view, the width X2 of the second component portion 94 including the frame 76, the second frame portion 32C, and the weather strips 78, 80 in the direction orthogonal to the gaze direction of the driver 18 is equal to or less than the standard pupillary distance A.

Accordingly, in the first embodiment, expansion toward the outside of the vehicle of a blind spot occurring in the second component portion 94 when the front pillar 30 side on the seat 16 side is seen by the driver 18 is further suppressed. Therefore, in the first embodiment, blocking of the view of the driver 18 attributable to the frame 76 and the weather strips 78, 80 can be further suppressed.

In the first embodiment, the windshield molding 72 is disposed in the boundary portion between the windshield glass 24 and the first frame portion 32B. In cross-sectional view, the width X1 of the first component portion 92 including the first frame portion 32B and the windshield molding 72 in the direction orthogonal to the gaze direction of the driver 18 is equal to or less than the standard pupillary distance A.

Accordingly, in the first embodiment, expansion toward the outside of the vehicle of a blind spot occurring in the first component portion 92 when the front pillar side on the seat 16 side is seen by the driver 18 is further suppressed. Therefore, in the first embodiment, blocking of the view of the driver 18 attributable to the windshield molding 72 can be further suppressed.

In the first embodiment, the first plate material 54 is attached to the vehicle inner side of the front pillar 30 on the seat 16 side and the vehicle inner side part of the first frame portion 32B and the vehicle inner side part of the second frame portion 32C are connected to each other by the first plate material 54. The second plate material 56 is attached to the vehicle outer side of the front pillar 30 and the vehicle outer side part of the first frame portion 32B and the vehicle outer side part of the second frame portion 32C are connected to each other by the second plate material 56. A closed sectional structure is formed by the first frame portion 32B, the second frame portion 32C, the first plate material 54, and the second plate material 56.

Accordingly, in the first embodiment, a load during rollover or the like can be supported with the closed sectional structure formed by the first frame portion 32B, the second frame portion 32C, the first plate material 54, and the second plate material 56. The view of the driver 18 can be maintained between the first frame portion 32B and the second frame portion 32C. Therefore, in the first embodiment, the rigidity with respect to a load during rollover or the like of the vehicle body 26 can be increased by the front pillar 30 being reinforced and the visibility of the outside of the vehicle from the seat 16 can be maintained at the same time.

Although the windshield glass 24 and the second plate material 56 are attached to the first frame portion 32B in the first embodiment, it is conceivable that the view of the driver 18 is blocked by the attachment places of the windshield glass 24 and the second plate material 56 depending on how the attachment places of the windshield glass 24 and the second plate material 56 are disposed.

In this regard, in the first embodiment, the first frame portion 32B is configured to include the first outer wall portion 46B1 and the second outer wall portion 46B3 and the second outer wall portion 46B3 is disposed at a position that is a blind spot when seen by the driver 18. The first outer wall portion 46B1 is disposed at a position that is a blind spot when seen by the driver 18 and is on the vehicle rear side of the second outer wall portion 46B3 and extends continuously to the second outer wall portion 46B3. The peripheral edge portion 24A of the windshield glass 24 is attached to the second outer wall portion 46B3, and the vehicle-front-side peripheral edge portion of the second plate material 56 is attached to the first outer wall portion 46B1.

Accordingly, in the first embodiment, blocking of the view of the driver 18 attributable to the attachment place of the windshield glass 24 to the second outer wall portion 46B3 and the attachment place of the second plate material 56 to the first outer wall portion 46B1 can be further suppressed.

In the first embodiment, the vehicle-front-side peripheral edge portion of the second plate material 56 attached to the first frame portion 32B is positioned on the rear outer side of the vehicle with respect to the peripheral edge portion 24A of the windshield glass 24 also attached to the first frame portion 32B. Accordingly, in the first embodiment, scattering toward the second plate material 56 of the liquid such as the washer fluid flowing along the windshield glass 24 during traveling of the vehicle 10 or the like can be further suppressed. Therefore, in the first embodiment, a decline in the visibility of the outside of the vehicle from the seat 16 attributable to liquid adhesion to the second plate material 56 can be further suppressed.

In the first embodiment, the windshield molding 72 is disposed in the boundary portion between the windshield glass 24 and the second plate material 56 and the direction of the flow of the liquid such as the washer fluid flowing along the windshield glass 24 can be changed with the windshield molding 72 during traveling of the vehicle 10 or the like. Accordingly, in the first embodiment, a flow of the liquid flowing along the windshield glass 24 toward the second plate material 56 can be further suppressed and the accuracy of further suppressing adhesion of the liquid to the second plate material 56 can be improved.

In the first embodiment, the first frame portion 32B and the second frame portion 32C are made of high-tensile steel, and thus the strength of the front pillar 30 with respect to a load during rollover or the like can be ensured and the front pillar 30 can be reduced in thickness at the same time compared to a case where a general steel material constitutes the front pillar 30. Accordingly, in the first embodiment, the strength of the front pillar 30 can be ensured and the weight of the front pillar 30 can be reduced at the same time.

In the first embodiment, the first plate material 54 is provided with the solid portion 54A interposed between the first frame portion 32B and the second frame portion 32C. Accordingly, the second moment of area of the section seen from the longitudinal direction of the front pillar 30 can be further increased at the part of the front pillar 30 configured to include the first frame portion 32B and the second frame portion 32C. As a result, the rigidity of the part of the front pillar 30 configured to include the first frame portion 32B and the second frame portion 32C with respect to a load during rollover or the like can be further improved. Accordingly, in the first embodiment, the rigidity of the front pillar 30 can be ensured and the visibility of the outside of the vehicle from the seat 16 can be ensured at the same time.

In the first embodiment, the first plate material 54 is provided with the first extending portion 54B extending from the solid portion 54A to the first frame portion 32B side and the second extending portion 54C extending from the solid portion 54A to the second frame portion 32C side. The first extending portion 54B is disposed on the vehicle inner side of the first frame portion 32B. Likewise, the second extending portion 54C is disposed on the vehicle inner side of the second frame portion 32C.

It is conceivable that the first frame portion 32B and the second frame portion 32C are relatively displaced and the cross-sectional shape of the part of the front pillar 30 configured to include the first frame portion 32B and the second frame portion 32C that is seen from the longitudinal direction cannot be maintained when the first frame portion 32B and the second frame portion 32C are deformed due to a load during rollover or the like.

In this regard, in the first embodiment, the front surface portion 54A1 of the solid portion 54A on the first frame portion 32B side and the side surface portion 54B1 of the first extending portion 54B on the first frame portion 32B side are joined to the first frame portion 32B via the joining portion 58 that can be elastically deformed. The rear surface portion 54A2 of the solid portion 54A on the second frame portion 32C side and the side surface portion 54C1 of the second extending portion 54C on the second frame portion 32C side are joined to the second frame portion 32C via the joining portion 60 that can be elastically deformed.

Accordingly, in the first embodiment, the relative displacement of the first frame portion 32B and the second frame portion 32C is supported with the solid portion 54A and the relative displacement is further suppressed when the first frame portion 32B and the second frame portion 32C are deformed in directions approaching each other. The relative displacement is further suppressed by the restoring forces of the joining portions 58, 60 when the first frame portion 32B and the second frame portion 32C are deformed in directions away from each other. Therefore, in the first embodiment, collapse of the cross-sectional shape of the section of the part configured to include the first frame portion 32B and the second frame portion 32C that is seen from the longitudinal direction can be further suppressed when the front pillar 30 is deformed by a load during rollover or the like.

In addition, in the first embodiment, the vehicle inner side part of the first frame portion 32B and the vehicle inner side part of the second frame portion 32C are connected to each other by the first plate material 54. Accordingly, the joining portions 58, 60 are disposed inside the vehicle cabin and the joining portions 58, 60 can be hidden by the first pillar garnish 84 and the second pillar garnish 86. Therefore, in the first embodiment, the design of the inside of the vehicle cabin 12 can be ensured.

Second Embodiment

Hereinafter, a second embodiment of the front pillar structure according to the aspect of the invention will be described with reference to FIG. 6. The same reference numerals will be used to refer to the same component parts as in the first embodiment described above and description thereof will be omitted.

The first plate material 54 is not disposed in the front pillar structure according to the second embodiment. As a result, the first pillar garnish 84 is changed to a first pillar garnish 100 and the second pillar garnish 86 is changed to a second pillar garnish 102.

The first pillar garnish 100 has a J-shaped cross section when seen from the longitudinal direction of the front pillar 30 and has a plate shape extending along the first frame portion 32B. The first pillar garnish 100 is configured to include an inner side wall portion 100A, a front side wall portion 100B, and a rear side wall portion 100C.

The inner side wall portion 100A is similar in configuration to the inner side wall portion 84A of the first pillar garnish 84. The front side wall portion 100B is similar in configuration to the front side wall portion 84B of the first pillar garnish 84. The rear side wall portion 100C extends toward the outer side of the vehicle from the vehicle-rear-side peripheral edge portion of the inner side wall portion 100A along the rear wall portion 48B1 and the inclined wall portion 48B2 of the first frame portion 32B and covers the rear wall portion 48B1 and the inclined wall portion 48B2 of the first frame portion 32B from the rear side of the vehicle. The first pillar garnish 100 is attached to the front wall portion 4814 of the first frame portion 32B via a joining portion 104 based on a urethane adhesive or the like.

The second pillar garnish 102 is provided with a body portion 102A and a front side wall portion 102B. The body portion 102A is similar in configuration to the second pillar garnish 86. The front side wall portion 102B extends toward the outer side of the vehicle from the vehicle-front-side peripheral edge portion of the body portion 102A along the front wall portion 48C1 and the inclined wall portion 48C2 of the second frame portion 32C. The front side wall portion 102B covers the front wall portion 48C1 and the inclined wall portion 48C2 from the front side of the vehicle. The second pillar garnish 102 is attached to the inclined wall portion 48C2 via a joining portion 106 based on a urethane adhesive or the like.

Also in the second embodiment, a width Y1 of a first component portion 108 made up of the first frame portion 32B, the windshield molding 72, and the first pillar garnish 100 in the direction orthogonal to the gaze direction of the driver 18 is equal to or less than the standard pupillary distance A in cross-sectional view. Likewise, a width Y2 of a second component portion 110 made up of the second frame portion 32C, the frame 76, the weather strips 78, 80, and the second pillar garnish 102 in the direction orthogonal to the gaze direction of the driver 18 is equal to or less than the standard pupillary distance A in cross-sectional view.

The configuration described above has the same action and effect as in the first embodiment described above with the exception of the action and effect achieved by the first plate material 54. In the second embodiment, the visibility of the outside of the vehicle from the gap between the first frame portion 32B and the second frame portion 32C can be further improved compared to the configuration of the first embodiment in which the first plate material 54 and the second plate material 56 are disposed.

In addition, the parts of the first frame portion 32B and the second frame portion 32C that face the inside of the vehicle cabin 12 can be hidden by the first pillar garnish 100 and the second pillar garnish 102. Accordingly, in the second embodiment, the design of the front pillar 30 seen from the inside of the vehicle cabin 12 can be ensured.

Additional Description of Embodiments Described Above (1) In the embodiments described above, the penetration portion 40 disposed in the front pillar 30 has a rectangular shape when seen from the gaze direction of the driver 18. However, the disclosure is not limited thereto. For example, the penetration portion 40 may have a triangular shape widened from the upper side of the vehicle toward the lower side of the vehicle when seen from the gaze direction of the driver 18 depending on the configuration of the peripheral portion of the front pillar 30 and so on. The range in which the penetration portion 40 is disposed can also be appropriately changed depending on the configuration of the vehicle 10 and so on. The first plate material 54 may have a block shape depending on the configuration of the penetration portion 40.

(2) In the embodiments described above, the front pillar structure according to the embodiment described above is applied to the right-hand drive vehicle 10. However, the disclosure is not limited thereto. The front pillar structure according to the embodiment described above may also be applied to the front pillar of a left-hand drive vehicle that is on the left side in the vehicle width direction.

(3) In the embodiments described above, the transparent plate material formed of inorganic glass, a high-strength transparent resin, or the like is attached to the outer side surface portion 30A and the inner side surface portion 30C of the front pillar 30. However, the disclosure is not limited thereto. In an alternative configuration, for example, a transparent plate material formed of a transparent resin material with a relatively low strength may be attached to the outer side surface portion 30A and the inner side surface portion 30C of the front pillar 30 depending on the configuration of the front pillar 30 and so on. In the configuration described above, the front pillar 30 may be reinforced by a truss-shaped reinforcing member or the like being disposed between the first frame portion 32B and the second frame portion 32C.

(4) In the embodiments described above, the gap D between the first frame portion 32B and the second frame portion 32C is set to 65 [mm]. However, the gap D may be widened depending on the configuration of the vehicle 10 or the gap D may be narrowed as long as the outside of the vehicle is visible to the driver 18.

(5) In the first embodiment described above, the transparent plate material provided with the solid portion is attached to the inner side surface portion 30C of the front pillar 30. In an alternative configuration, however, a transparent plate material provided with a solid portion may be attached to the outer side surface portion 30A depending on the configuration of the front pillar 30 and so on. Depending on the configuration of the front pillar 30 and so on, the first plate material 54 may also have a plate shape with a uniform plate thickness, as is the case with the second plate material 56, without the solid portion 54A being disposed in the first plate material 54.

(6) In the second embodiment described above, the transparent plate material is attached to the outer side surface portion 30A of the front pillar 30. However, the disclosure is not limited thereto. In an alternative configuration, for example, a transparent plate material may be disposed like a bridge between a rear surface portion of the first frame portion 32B facing the rear side of the vehicle and a front surface portion of the second frame portion 32C facing the front side of the vehicle depending on the configuration of the front pillar 30, the configuration of the vicinity of the front pillar 30, and so on. In the configuration described above, the transparent plate material may function as a solid portion by the thickness of the transparent plate material being increased. In addition, a configuration may be adopted, depending on the configuration of the front pillar 30 and so on, in which the rigidity with respect to a load during rollover or the like can be ensured by a solid portion being disposed in the transparent plate material attached to the outer side surface portion 30A of the front pillar 30.

What is claimed is:

1. A front pillar structure on a driver's seat side of a vehicle, the front pillar structure comprising:
    a first skeleton portion extending along a peripheral edge portion of a windshield glass of the vehicle on an outer side in a vehicle width direction of the vehicle, the first skeleton portion having a hollow closed cross-section seen from a longitudinal direction of the first skeleton portion;
    a second skeleton portion extending along the first skeleton portion and separated by a gap from the first skeleton portion, the second skeleton portion extending along a side door on the driver's seat side of the vehicle, the second skeleton portion having a hollow closed cross-section seen from a longitudinal direction of the second skeleton portion; and
    a transparent connecting portion disposed between the first skeleton portion and the second skeleton portion, the transparent connecting portion including a solid portion interposed between the first skeleton portion and the second skeleton portion, and connecting the first skeleton portion and the second skeleton portion to each other, wherein:
    the solid portion of the transparent connecting portion includes (i) a first extending portion disposed on one of a vehicle outer side and a vehicle inner side of the first skeleton portion and extending from the solid portion toward the first skeleton portion side and (ii) a second extending portion disposed on one of a vehicle outer side and a vehicle inner side of the second skeleton portion and extending from the solid portion toward the second skeleton portion side;
    a front surface portion of the solid portion on the first skeleton portion side and a first side surface portion of the first extending portion on the first skeleton portion side are joined to the first skeleton portion via a first joining portion that is elastically deformable; and
    a rear surface portion of the solid portion on the second skeleton portion side and a second side surface portion of the second extending portion on the second skeleton portion side are joined to the second skeleton portion via a second joining portion that is elastically deformable.

2. The front pillar structure according to claim 1, wherein:
    the solid portion is a first transparent plate;
    the transparent connecting portion includes a second transparent plate;
    the first transparent plate connects a vehicle inner side part of the first skeleton portion and a vehicle inner side part of the second skeleton portion to each other; and
    the second transparent plate connects a vehicle outer side part of the first skeleton portion and a vehicle outer side part of the second skeleton portion to each other.

3. The front pillar structure according to claim 1, wherein the transparent connecting portion is a transparent plate and connects a vehicle outer side part of the first skeleton portion and a vehicle outer side part of the second skeleton portion to each other.

4. The front pillar structure according to claim 1, wherein the first skeleton portion and the second skeleton portion are made of high-tensile steel.

\* \* \* \* \*